July 27, 1954 G. MANG 2,685,014

AUTOMATIC CUTOUT

Filed Dec. 19, 1951 2 Sheets-Sheet 1

INVENTOR:
GÉRARD MANG
BY Leon M. Straus
Att.

AUTOMATIC CUTOUT

Filed Dec. 19, 1951

INVENTOR:
GÉRARD MANG
BY Leon M. Straus
AGT.

Patented July 27, 1954

2,685,014

UNITED STATES PATENT OFFICE 2,685,014

AUTOMATIC CUTOUT

Gérard Mang, Paris, France

Application December 19, 1951, Serial No. 262,450

Claims priority, application France December 22, 1950

2 Claims. (Cl. 200—138)

This invention relates to a device adapted automatically to break an electrical circuit when the current flowing therethrough exceeds a predetermined value.

It is an object of the present invention to provide an automatic cut-out of this type which is adapted to be reset as soon as the cause of its release has been eliminated, the resetting being a simple operation effected by the user requiring neither fuse-wire nor any tools such as screw-driver, etc.

The cut-out according to this invention comprises a thin cup-shaped bimetallic snap disk adapted when its temperature rises above a certain value suddenly to change its curvature, this disk being fixed by its center in a casing and carrying movable contacts adapted to engage fixed contacts in the position normally occupied by the disk when its temperature is lower than its cut-out or reversing value, and means for restoring the disk to its normal position after a reversal of its curvature resulting from a rise of temperature and when its temperature has dropped to a value below this reversing value.

The snap disk may be either solid with a central hole or formed with arms and a peripheral rim so as to have the shape of a wheel in plane view. It may consist of either an integral member or a plurality of assembled parts, for example with an added peripheral rim or hub portion. The outer contour of the disk may be circular or not; besides, the disk may be formed with external extensions.

According to another possible feature of the invention, the means for restoring the disk to its normal position consist of means adapted to exert a pressure on the periphery of the disk, preferably at two diametrically opposite points on a line at right angles with the contact line.

Preferably, the means for exerting a pressure on the periphery of the snap disk consist of the combination of a member movably mounted on the side of the disk which is opposite to the contacts and the movement of which may be controlled by hand from the outside, with projections carried by the movable member and registering with the periphery of the disk. This movable member may consist of an elastic and deformable side wall of the casing, for example a cover, or a bar fast with a push-button passing through the corresponding wall of the casing.

The casing may be provided with plug-in pins so as to ensure its interchangeability with known types of fuses, with or without calibrated pins. Instead of pins it may be provided with a pair of suitably shaped contacts in view of fixing the device either to a so-called "box" type fuse by substituting the device for the fuse-wire carrying cover, or to any other apparatus in which a fuse wire is semi-enclosed.

The shape of the casing may be designed to make the device interchangeable with other calibrated-fuse cut-out known or not, such as screw-in, bayonet or cartridge fuses.

The accompanying drawings forming part of this specification illustrate by way of example one possible embodiment of an automatic cut-out according to this invention. In the drawings.

Figure 1:
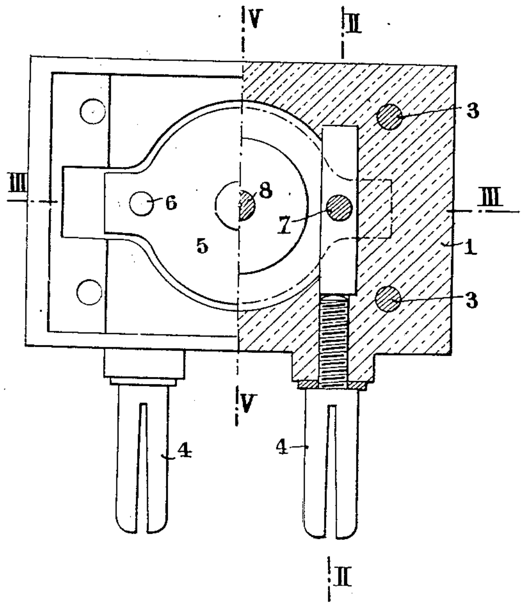
Fig. 1 is a half-sectional, half-plane view of the cut-out device with the cover removed, the section being taken along the line I—I of Fig. 2.
Figure 2:
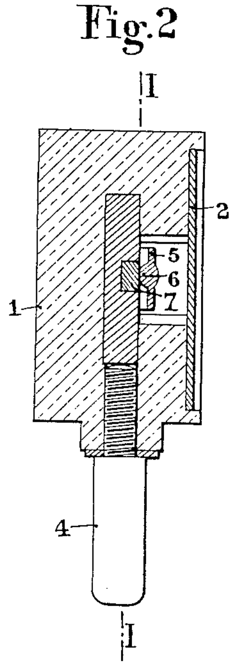
Fig. 2 is a section according to the line II—II of Fig. 1.
Figure 3:
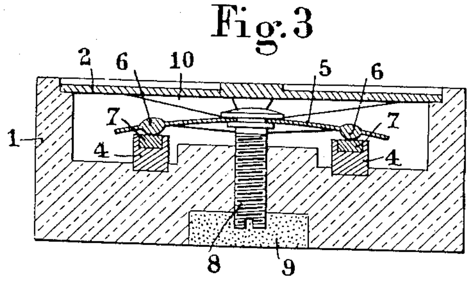
Fig. 3 is another sectional view along the line III—III of Fig. 1 showing the cut-out in its normal or pre-set position.
Figure 4:
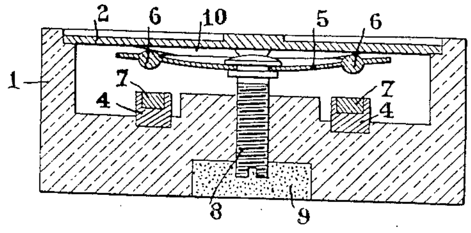
Fig. 4 is a view similar to Fig. 3 showing the cut-out in its circuit-disconnecting or released position.
Figure 5:
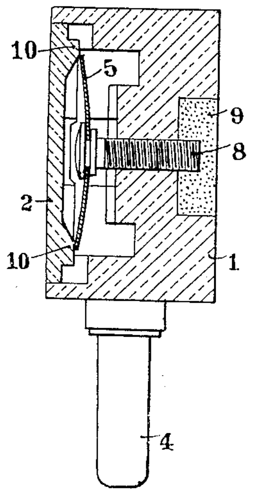
Fig. 5 is a sectional view along the line V—V of Fig. 1 showing the cut-out in its released position.

As illustrated in the drawings the apparatus according to the invention comprises a casing 1 having a lateral side closed by a cover 2 assembled for example by means of rivets 3, and a pair of plug-in pins 4 screwed in one side wall of the casing. The diameter and spacing of these pins are such as to comply with plug-in fuse standard specifications.

In this casing is disposed a resilient disk 5 called "snap" disk the concavo-convex shape of which is obtained beforehand by punching or pressing. This snap disk 5 is of the bimetallic type and carries movable contacts 6. The physical characteristics of the disk are estimated also in accordance with the same standard specification data; thus, if in a fuse a pin spacing of 20 mm. and a pin diameter of 5 mm. correspond to a current rating of 5 amperes, the current rating of a snap disk cut-out with 5 mm. plug-in pins spaced 20 mm. apart may also be five amperes.

As in conventional practice a suitable surface treatment is applied to the pins for preventing the oxidation of that portion thereof which engages the base of the cut-out; the opposite ends of these pins, which lie inside the casing, are advantageously shaped and coated in view of constituting fixed contacts 7 on which the movable contacts 6 carried by the resilient snap disk 5 will bear.

Centrally of the resilient snap disk 5 there is riveted an adjusting screw 8 formed with a collar portion and adapted to be screwed in the side wall of the casing. With this screw the device can be adjusted for temperature, that is, the current strength at which it is desired to bring about the reversal of curvature of the disk. Besides, in some cases it may be useful to "prime" or help the heating of the disk by means of a heating element electrically insulated from the snap disk; this element may consist of a fine wire winding through which the current is caused to flow.

The adjusting screw 8 is sealed by means of a suitable plastic substance 9 in view of holding it in a given position after the adjustment has been effected by the manufacturer. The sealing may be marked with a punch by the manufacturer in order to permit at any time to check if the adjustment of the apparatus has been modified.

The device thus constructed operates as follows:

With the resilient snap disk 5 in such a position that the movable contacts 6 carried thereby are pressed by the inherent resiliency of the disk against the fixed contacts 7, the circuit is closed. The current flows through pins 4 and disk 5 across contacts 6, 7. As long as the current value is lower than a predetermined value, the circuit remains closed; however, if for any reason such as instantaneous or continuous overload in the circuit, or in case of short-circuit, the current rises, the disk will be heated thereby and as its center is fixed its curvature will suddenly be reversed or snapped when the temperature attains a value corresponding to this reversal.

If the initial shape of the disk is such as to permit two positions of balance of this disk, the latter will remain in the position it has assumed after its reversal and will not resume by itself its initial position; however, when the temperature of the disk has cooled down to a value lower than that at which the reversal has occurred, the disk may be restored at will to its initial position in order to restore the current.

According to the invention, the cut-out comprises means for restoring the snap disk to its normal position, that is for resetting it, and in more exact terms, means for resetting the device by hand which act upon the periphery of the disk the center of which is fixedly held by the screw 8, this action upon the periphery of the disk making it possible to reverse again the curvature of the disk securely and with a reduced effort. Preferably, the contacts 6—6 and 7—7 are disposed according to the diametral plane of the disk 5 and these resetting means are so arranged as to act upon the periphery of the disk at two diametrically opposite points positioned on a line at right angles to the line of contacts 6—6.

These resetting means may consist of the combination of a member substantially parallel with the cover 2, movable between this cover and the disk 5 and the displacement of which may be controlled by hand from the outside, and projections carried by said movable member and registering with the periphery of the disk 5.

According to the embodiment illustrated in Figs. 1 to 5, the movable member consists of the cover 2 proper which, in this case, is made of deformable and elastic material, the projections, indicated by the reference numeral 10, being carried by the inner face of this cover and registering with a pair of diametrically opposite points of the periphery of the disk 5, positioned along a line at right angles to the diametrical line of contacts 6—6.

The cover 2 having a sufficient elasticity, it will be sufficient to exert a pressure thereon when the disk is in its released position for causing the projections 10 to act upon its periphery and snapping the disk back to its initial position. Then, by merely releasing the pressure on the cover 2 the latter will also resume its initial position due to its inherent elasticity.

The device constructed according to this specific embodiment is therefore a mechanically-operating, extremely simple cut-out consisting of but a very reduced number of parts and therefore adapted to be manufactured at a relatively low cost, this device being designed to replace known fuses, calibrated or not. Its constructional features are such as to permit the resetting of the device by merely applying a pressure on the cover, made of a sufficiently resilient material, the practical utilization of the device by a user being therefore extremely simple.

Figure 6:
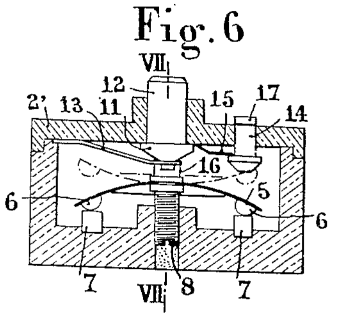
Figs. 6 and 7 illustrate a modified embodiment of the cut-out device in axial section according to two planes intersecting each other at right angles, Fig. 6 being a section along the plane VI—VI of Fig. 7, and Fig. 7 a section along the plane VII—VII of Fig. 6, respectively.
Figure 7:
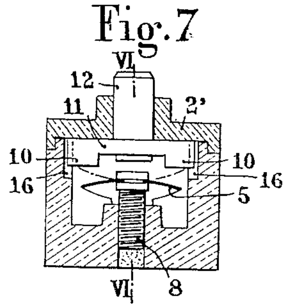

According to another embodiment of the apparatus according to the invention, illustrated in Figs. 6 and 7, the movable member carrying the projections 10 acting upon the disk 5 consists of a movable bar 11 connected with one end of a push-button 12 passing through a cover 2′ of non-elastic material and the other end of which emerges from above this cover. The projections 10 are carried by that side of the bar 12 which faces the disk 5 and registers with a pair of diametrically opposite points positioned on the periphery thereof along a line at right angles with the diametrical line of contacts 6—6. Preferably, the ends of the bar 11 engage registering notches 16 formed in the inner walls of the casing of the apparatus, these ends being therefore adapted slidably to engage these notches during the displacement of the bar 11, thereby preventing the latter from rotating about the axis of the push-button 12. For resetting the apparatus and more exactly the disk 5 it will be sufficient to depress the push-botton 12, a return spring 13 being advantageously fitted for restoring the bar 11 with the push-button 12 to its initial position after releasing the pressure exerted on this push-button. Preferably, a stud 14 may be movably mounted through the cover above a point of the periphery of the disk 5, one end of this stud being urged in a position of emergence inside the apparatus by a spring 15 while its other end 17 formed with a retaining shoulder is flush with, or slightly emerging from, the outer face of the cover 2′. If the disk is reversed and assumes its "break" position, its periphery will move the stud 14 outwards against the resiliency of the spring 15 and the jutting out of the stud 14 above the cover 2′ will indicate to the user that the device is released.

It will be noted that the device is of the free-release type, that is, as long as the disk temperature has not dropped to a value such as to allow the disk to resume its position of balance corresponding to room temperature, it is not possible to re-close the circuit by pressing on the resilient cover 2 or push-button 12.

It will be readily understood that the device according to the invention may be embodied in many forms, notably with respect to the arrangement and shape of the fixed contacts, the latter, notably, instead of consisting of plug-in pins, may consist of screws the heads of which could be used as fixed contacts, these screws being adapted to hold with their ends the contact members or knife-edge contacts to be engaged in the clips of the base of a conventional "box" type cut-out. Again, as already stated hereinabove. The elastic disk may have any other useful or desired shape.

Accordingly there has been provided a cut-out device comprising a casing having a plurality of side walls of which one is deformable and elastic, fixed contacts on the inner face of the side wall opposite to said deformable elastic side wall, terminal members connected to said fixed contacts, a bimetallic snap disk located in said casing opposite to said side wall carrying said fixed contacts, said disk being fixed by its center in relation to said casing, movable contacts carried by said disk and adapted to engage said fixed contacts in the position normally occupied by said bimetallic snap disk when the temperature thereof is lower than the reversing temperature, projections carried by the inner face of said deformable elastic side wall and registering with the peripheral portion of said disk in order to depress said peripheral portion when a pressure is applied to said deformable elastic side wall after said disk has been subjected to a sudden reversal of curvature by a rise in its temperature, thereby causing said disk to resume its normal position if the temperature thereof has dropped to a value lower than the snapping temperature.

Having thus described the invention, what is claimed as new and desired to be secured by Letters Patent, is:

1. Cut-out device comprising a casing having a plurality of side walls of which one is deformable and elastic, fixed contacts on the inner face of the side wall opposite to said deformable elastice side wall, terminal members connected to said fixed contacts, a bimetallic snap disk located in said casing opposite to said side wall carrying said fixed contacts, said disk being fixed by its center in relation to said casing, movable contacts carried by said disk and adapted to engage said fixed contacts in the position normally occupied by said bimetallic snap disk when the temperature thereof is lower than the reversing temperature, projections carried by the inner face of said deformable elastic side wall and registering with the peripheral portion of said disk in order to depress said peripheral portion when a pressure is applied to said deformable elastic side wall after said disk has been subjected to a sudden reversal of curvature by a rise in its temperature, thereby causing said disk to resume its normal position if the temperature thereof has dropped to a value lower than the snapping temperature.

2. Cut-out device comprising a casing having a plurality of side walls of which one is deformable and elastic, fixed contacts on the inner face of that side wall of said casing which is opposite to said deformable and elastic side wall, terminal members connected to said fixed contacts, a bimetallic snap disk located in said casing and registering with said side wall carrying said fixed contacts, said disk being fixed by its center in relation to said casing, movable contacts carried by the peripheral portion of said disk at points substantially diametrally opposite, and adapted to engage said fixed contacts in the position normally occupied by said bimetallic snap disk when the temperature thereof is lower than the reversing temperature, a pair of projections carried by the inner face of said deformable elastic side wall of said casing respectively in front of two substantially diametrally opposite points of the peripheral portion of said disk, said points being positioned on a transverse line in relation to the line of said movable contacts carried by said disk in order to bear on said peripheral portion when a pressure is applied to said deformable elastic wall after said disk has been subjected to a sudden reversal of its curvature due to a rise in its temperature, thereby causing said disk to resume its normal position if the temperature thereof has dropped to a value lower than the snapping temperature.

References Cited in the file of this patent

UNITED STATES PATENTS

| Number | Name | Date |
|---|---|---|
| 1,767,709 | Smith | June 24, 1930 |
| 2,199,388 | Bolesky | May 7, 1940 |
| 2,409,483 | Gandelof | Oct. 15, 1946 |
| 2,434,984 | Bolesky | Jan. 27, 1948 |